Jan. 14, 1958     P. SPERRY     2,820,088

RUBBER BUSHING

Filed Aug. 25, 1955

INVENTOR.
Pierce Sperry.
BY Wood, Herron & Evans.
ATTORNEYS.

United States Patent Office 2,820,088
Patented Jan. 14, 1958

2,820,088

RUBBER BUSHING

Pierce Sperry, Harrison, Ohio, assignor to The Sperry Rubber and Plastics Company, Brookville, Ind., a corporation Application August 25, 1955, Serial No. 530,474

5 Claims. (Cl. 174—153)

This invention relates to a rubber bushing device which is adapted to be installed in an aperture in the fire wall of an automobile, i. e., the wall which separates the engine compartment from the passenger compartment, to seal and resiliently journal the wires, rods, cables, etc. which pass through the aperture.

One of the primary objectives of the invention is to provide an inexpensive bushing device of the type set forth which may be installed in less time and with less difficulty than bushings employed in the past for the same general purposes.

An additional objective of the invention is to provide a rubber bushing device which includes novel, inexpensive means for securing it into place to seal the aperture and to support the elements which pass through the aperture.

Reference is now made to the drawings which disclose a bushing incorporating the principles of the invention and in which.

Figure 1:
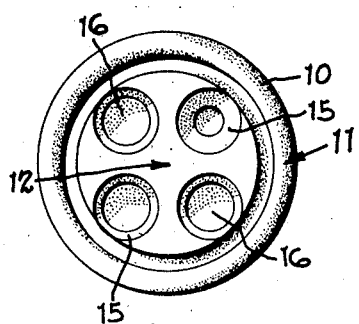
Figure 1 is an elevational view showing a face of the bushing.

The bushing devices shown in the drawings preferably are made of an inexpensive rubber as a molding. It will be readily apparent, however, that other resilient materials may be employed if desired. The preferred embodiment of the invention, which is shown in Figures 1–3, consists of a circular disk 10 having an annular rim portion designated generally 11, and a central diaphragm portion indicated generally at 12.

The bushing is adapted to be mounted in a circular aperture in a sheet metal wall such as the one designated 13, having a narrow flange 14 which is turned outwardly at right angles to the plane of the wall at one side thereof to provide a beading extending around the aperture. The provision of a beading or flange of the type shown at 14 is the only modification necessary in the structure of the wall. The provision of such a flange obviously does not add to the cost of fabrication of the wall inasmuch as it may be died out in the stamping operation in which the wall itself is formed.

In general, the novel features of the present bushing device resides in the annular area adjacent to the rim, it being this portion of the bushing which comprises the means for securing it to the wall at the aperture. The central portion 12 of the bushing inwardly of the edgewise portion 11 in following conventional practice includes a plurality of circular depressions 15 which are provided in pairs. The two depressions of each pair are aligned with one another at opposite sides of the bushing to leave a thin, rupturable diaphragm 16 in between them. The respective thin diaphragms are adapted to be broken through after the bushing is installed by pushing the wires, cables etc. through the bushing as will be readily apparent from a comparison of Figures 3 and 4. The thin diaphragm 16 in each instance provides a seal for a wire after it has been pushed through the diaphragm. Thus the bushing assembly seals the opening to prevent dust, water or drafts from entering the passenger compartment of the automoboile while at the same time providing resilient journals for the wires etc.

Figure 2:
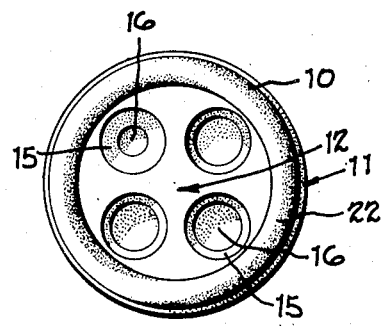
Figure 2 is an elevational view showing the face opposite to the one which is shown in Figure 1.
Figure 3:
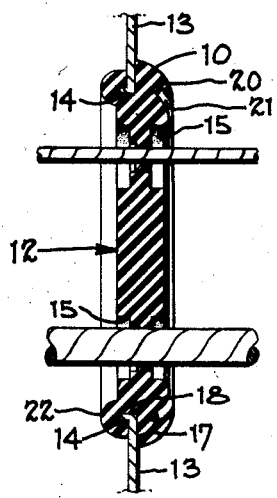
Figure 3 is a cross sectional view taken vertically through the bushing showing it in a typical installation, with wires passing through it.
Figure 5:
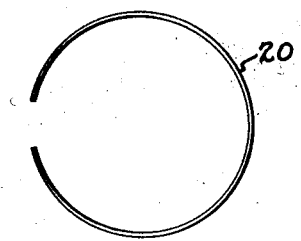
Figure 5 is an elevational view showing the preferred form of fastening means provided for locking the bushing in place.
Figure 6:
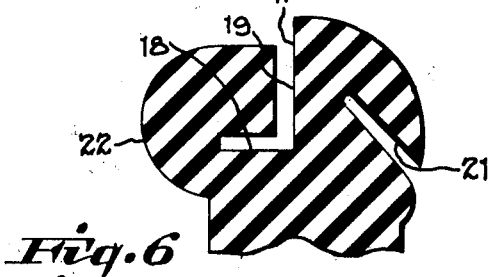
Figure 6 is an enlarged fragmentary cross sectional view showing the configuration of the outer rim portion of the bushing of Figure 3.

The outer rim portion of the bushing of the modification shown in Figures 1–3 is best illustrated in the fragmentary cross sectional view of Figure 6. The outer edge of the bushing has an L-shaped pocket 17 formed in it which extends entirely around the bushing and which is configurated to seat in the part thereof designated 18 the out-turned flange 14 of the fire wall. The portion designated 19 of the pocket is adapted to receive the planar portion of the fire wall immediately surrounding the aperture. With the flange 14 seated as shown in Figure 3, the bushing is held in place. However, to securely lock it, additional means are provided. These means consist of an expansible split ring 20 which may be formed of wire as shown in Figure 5. This ring is adapted to be seated in an angularly-shaped pocket 21 which is best illustrated in Figure 6. The pocket is in the shape of a frustum of a cone having its inner circular end within the annular area of the bushing at a point outwardly from the part 18 of the L-shaped pocket 17. The pocket opens at a circle which is inwardly of the part 18 at one side of the bushing. As shown, the marginal rim portion 11 of the bushing bulges at the side which accommodates the expansible ring 20 to provide material in this area to resist the expanding force of the ring. At the opposite side of the bushing the annular area 11 is also bulged as at 22 to provide a circular beading providing a substantial amount of material surrounding the part 18 of pocket 17.

In the installation of the bushing it is first collapsed by squeezing it. It is then placed in the aperture and the flange 14 engaged into the pocket 17. The expansible ring 20 is then placed in pocket 21 and the bushing is locked in place. By having the expansible ring in the angulated pocket 21, the tendency for the ring to expand places a radially directed force on the diaphragm which securely holds it in place, inasmuch as it can only be removed by being collapsed in a direction opposite to the force of the ring.

Figure 4:
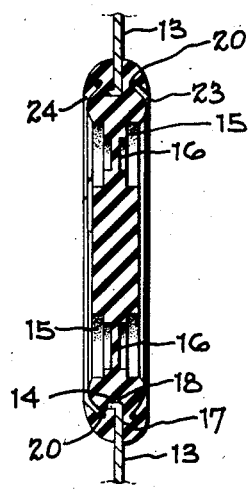
Figure 4 is a view similar to Figure 3 showing a modified form of the invention.

Figure 4 shows a slight modification of the bushing in which two expansible rings are employed, these rings being seated in angularly disposed, frusto-conical pockets 23 and 24 which are formed on both sides of the bushing in the same way that pocket 21 is formed in the modification of Figures 1–3. The use of two rings provides a more secure lock, making it virtually impossible to remove the bushing without first removing both split rings.

Having described my invention, I claim:

1. The combination of a thin wall having a circular aperture therein and a right angular flange extending from one side of said wall immediately surrounding said aperture and a rubber bushing adapted to be mounted in said aperture, said bushing having means in the central portion thereof to resiliently support and seal wires, rods, cables and the like passing through the aperture and the bushing, said bushing having a pocket in the outer edge thereof snugly seating said right angular flange and the portion of the wall immediately surrounding said flange, a second pocket formed in the outer annular area of said bushing which is in the shape of a frustum of a cone and which terminates at its inner edge at a circle which is of a diameter at least as great as the diameter of the flange and which opens at a circle at the one side of said bushing which is of a diameter substantially smaller than the diameter of said flange, and an expansible split ring engaged in the latter pocket and exerting a force in a direction radially outwardly to lock the bushing in place on the wall.

2. The combination as set forth in claim 1 in which two of the said second pockets are provided, one being at each side of said bushing and each seating an expansible split ring.

3. A bushing adapted to be seated in a circular aperture which is in a sheet metal wall, said wall having a flange extending at right angles from one side thereof immediately surrounding said aperture, said bushing being made of rubber and having means in the central portion thereof to resiliently support and seal wires, rods, cables and the like passing through said aperture, a pocket in the outer edge of said bushing adapted to snugly seat said flange and the portions of the wall immediately surrounding said flange, a second pocket formed in the outer annular area of said bushing which is in the shape of a frustum of a cone and which terminates at its inner edge at a circle which is of a diameter at least as great as the diameter of the flange and which opens at a circle at the one side of said bushing which is of a diameter substantially smaller than the diameter of said flange, and an expansible split ring adapted to be engaged in the latter pocket and exert a force in a direction radially outwardly to hold the bushing in place on the wall when the flange is seated in the first named pocket.

4. The bushing as set forth in claim 3 in which two of the said second pockets are provided, one being at each side of said bushing and there being a split expansible ring for each pocket.

5. The combination of a sheet metal wall having a circular aperture therein and a right angular flange extending from one side of said wall immediately surrounding said aperture and a rubber bushing adapted to be mounted in said aperture, said bushing including means in the central portion thereof to resiliently support and seal wires, rods, cables and the like passing through said aperture, said bushing having a pocket in the outer edge thereof snugly seating said flange and the portion of the wall immediately surrounding said flange, a second pocket formed in the outer annular area of said bushing which is in the shape of a frustum of a cone and which terminates at its inner edge at a circle which is of a diameter greater than the diameter of the flange and expansible means seated in the latter pocket to exert a force radially outwardly to lock the bushing in place on the wall.

References Cited in the file of this patent

UNITED STATES PATENTS

| | | |
|---|---|---|
| 2,104,217 | Barnes | Jan. 4, 1938 |
| 2,383,018 | Shere | Aug. 21, 1945 |